United States Patent [19]

Kapfer et al.

[11] Patent Number: 4,660,121
[45] Date of Patent: Apr. 21, 1987

[54] ELECTRONIC SAFETY BARRIER

[75] Inventors: Karl Kapfer, Moeckmuehl; Gerhad Schwarz, Allemuehl, both of Fed. Rep. of Germany

[73] Assignee: Brown, Boveri & Cie AG, Mannheim, Fed. Rep. of Germany

[21] Appl. No.: 707,517

[22] Filed: Mar. 4, 1985

[30] Foreign Application Priority Data

Mar. 2, 1984 [DE] Fed. Rep. of Germany ....... 3407800

[51] Int. Cl.$^4$ .............................................. H02H 9/02
[52] U.S. Cl. ....................................... 361/58; 361/93; 323/278
[58] Field of Search ....................... 361/18, 58, 87, 93, 361/101, 78; 323/266, 269, 270, 276–278; 307/326, 98, 99, 130, 131

[56] References Cited

U.S. PATENT DOCUMENTS

| 3,711,763 | 1/1977 | Peterson | 323/276 |
| 3,796,943 | 3/1974 | Nelson et al. | 323/277 |
| 3,906,310 | 9/1975 | Esashika | 323/278 X |
| 4,530,023 | 7/1985 | Brown | 361/58 |

Primary Examiner—A. D. Pellinen
Assistant Examiner—T. DeBuer
Attorney, Agent, or Firm—Herbert L. Lerner; Laurence A. Greenberg

[57] ABSTRACT

An intrinsically safe safety barrier includes an outgoing line, a return line, two switching transistors connected in the outgoing line, at least two control transistors having base-emitter circuits for controlling the switching transistors in order to regulate current when current increases in the outgoing line, and a single sensing resistor connected in the outgoing line in the base-emitter circuits of each of the control transistors.

10 Claims, 7 Drawing Figures

ELECTRONIC SAFETY BARRIER

The invention relates to an electronic safety barrier, having an outgoing line with limiting resistors and two switching transistors, and a return or ground line with at least two control transistors controlling the switching transistors in order to regulate the current when the current increases in the outgoing line.

According to DIN EN 50014 (VDE 0170/0171) and in particular EN 50020, intrinsically safe circuits are those circuits in which no sparks and no thermal effects can cause a specific explosive atmosphere to ignite during normal operation.

More particularly, the invention relates to the safety barriers according to DIN EN 50020, Item 8, which are disposed between intrinsically safe and non-intrinsically safe circuits.

Two such prior art circuits will be more fully discussed below. Both circuits include two sensing resistors in the outgoing lead, by means of which the switching and control transistors can be controlled. The result is that the voltage drop in both circuits that satisfy the above-mentioned requirements, is relatively high.

It is accordingly an object of the invention to provide an electronic safety barrier which overcomes the hereinafore-mentioned disadvantages of the heretofore-known devices of this general type, and in which the voltage drop is reduced even further.

With the foregoing and other objects in view there is provided, in accordance with the invention, an intrinsically safe safety barrier, comprising an outgoing line, a return or ground line, two switching transistors connected in the outgoing line, at least two control transistors having base-emitter circuits for controlling the switching transistors in order to regulate current when current increases in the outgoing line, and a single sensing resistor instead of limiting resistors connected in the outgoing line in the base-emitter circuits of each of the control transistors.

Instead of two sensing resistors in the outgoing lead, only one resistor is provided according to the invention, the voltage drop of which is used to regulate both control transistors. In accordance with another feature of the invention, the emitters of each of the control transistors are jointly connected to one end of the sensing resistor, and the bases of each of the control transistors are jointly connected to the other end of the sensing resistor.

In accordance with a further feature of the invention, the emitters of each of the control transistors are jointly connected to one end of the sensing resistor, and including two other resistors each being connected between the base of a respective one of the control transistors and the other end of the sensing resistor. In this way, a simultaneous regulation of both control transistors is achieved and accordingly also a simultaneous regulation of the two switching and/or control transistors.

In accordance with an added feature of the invention, there are provided two further control transistors for further controlling the switching transistors, each of the further control transistors having a base connected to the collector of a respective one of the first-mentioned control transistors. This embodiment is a particularly advantageous development inasmuch as the regulation is improved.

In accordance with a concomitant feature of the invention, the control transistors are first and second control transistors, the emitter of the first and the base of the second control transistors are jointly connected to one end of the sensing resistor, and the emitter of the second and the base of the first control transistors are jointly connected to the other end of the sensing resistor. Other features which are considered as characteristic for the invention are set forth in the appended claims.

Although the invention is illustrated and described herein as embodied in an electronic safety barrier, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
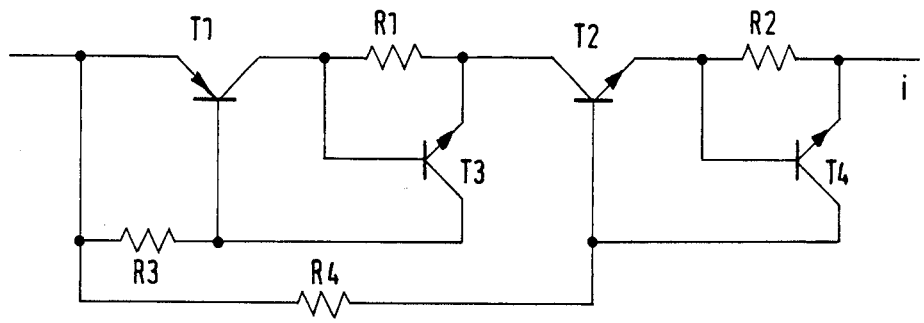
FIGS. 1 and 2 are schematic circuit diagrams of two circuits for a safety barrier according to the state of the art.

Referring now to the figures of the drawings in detail and first particularly to FIG. 1 thereof, there is seen a prior art circuit including two switching transistors T1 and T2, wherein one end of a first sensing resistor R1 is connected downstream of the emitter of the first switching transistor T1 and the other end thereof is connected to the collector of the second switching transistor T2. The emitter of the second switching transistor T2 is connected to a second sensing resistor R2. The first sensing resistor R1 is connected in the base-emitter circuit of a first control transistor T3, and the second resistor R2 is connected in the base emitter circuit of a second control transistor T4. The collector of the first control transistor T3 is connected to the base of the first switching transistor T1, and the collector of the second control transistor T4 is connected to the base of the second switching transistor T2; in addition, a first base resistor R3 is connected in the collector-base circuit of the first switching transistor T1; the base of the second switching transistor T2 is connected through a second base resistor R4, which is practically parallel to the first base resistor R3 and the control transistor T3. The two switching transistors T1 and T2 are controlled through the two base resistors R3 and R4. If the voltage drop at the two resistors R1 and R2 exceeds the base-emitter voltage of the transistors T3 and T4, a control current flows through the collector-emitter sections and the switching transistors T1 and T2 shut off. Due to the small loop gain and the fact that the resistors R3 and R4 have to be low-resistance resistors in order to be able to control the transistors T1 and T2, the conventional circuit according to FIG. 1 is associated with the property of being a relatively moderate power source.

Figure 2:
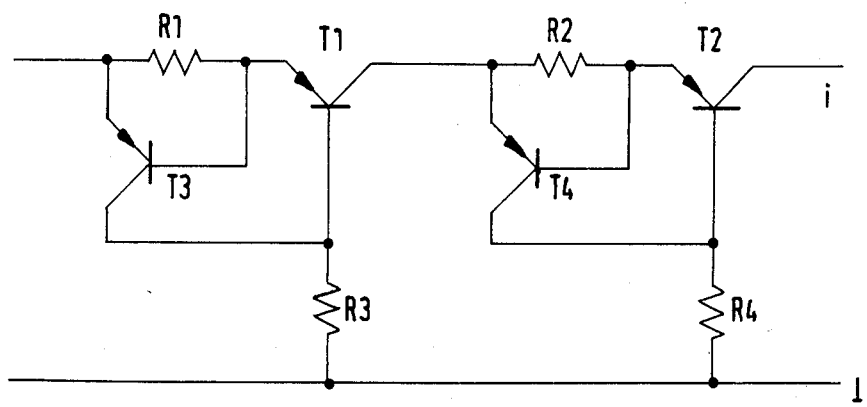

FIG. 2 shows another prior art circuit, which represents a substantial improvement over the embodiment illustrated in FIG. 1. The resistor R1 in FIG. 2 is connected in the emitter section upstream of the switching or control transistor T1; the second resistor R2 is connected to the collector of the first control transistor T1 and to the emitter of the second control transistor T2; the resistors R1 and R2 are each connected in the base-emitter section of a respective one of the two control transistors T3 and T4; the collectors of the control transistors T3 and T4 are each connected to the base of a respective one of the control transistors T1 and T2. At the same time, the base of each of the transistors T1 and T2 is connected through a respective one of the resistors R3 and R4 to the return lead. The FIG. 2 circuit is the best of the prior art circuits known at the present time with regard to voltage drop; however, since a leakage current can flow through the resistors R3 and R4 in some cases, this circuit is of only limited suitability for intrinsically safe measuring or testing circuits.

Figure 3:
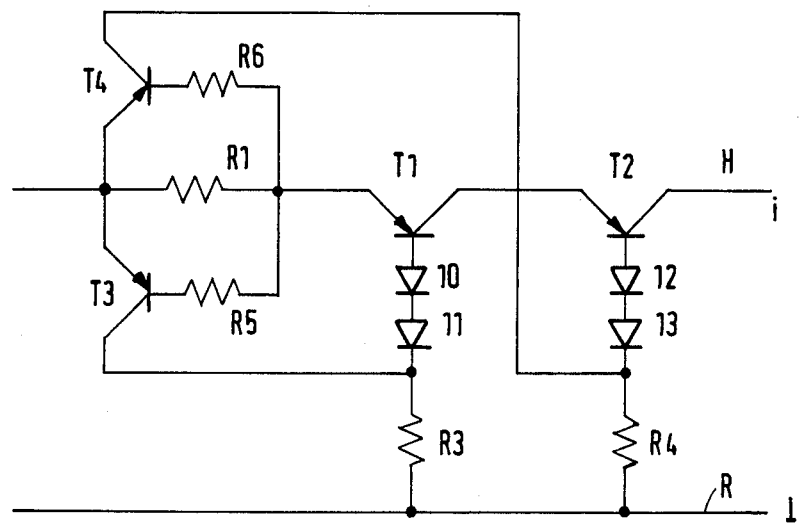
FIG. 3 is a circuit diagram of a first embodiment of a safety barrier according to the invention.

The circuit according to FIG. 3 includes an outgoing line H and a return line R. A non-intrinsically safe circuit is shown on the left-hand side, and an intrinsically safe circuit is shown on the right-hand side, designated by the letter "i"; this also holds true for the circuits according to FIGS. 4 to 6. In the other figures, the same letters and reference numerals designate the same or at least similar components; furthermore, the embodiments according to FIGS. 1 and 2 use the same or at least similar components as in FIGS. 3 to 6.

The sensing resistor R1 is disposed in the outgoing line H and more specifically, it is connected to the emitter of the first switching or control transistor T1. The collector of the first control transistor T1 is connected to the emitter of the second control transistor T2, and the collector of the second control transistor T2 is connected to the output of the safety barrier. One end of the resistor R1 is connected to the emitters of the control transistors T3 and T4. The base of each transistor T3, T4 is connected through a respective resistor R5, R6 to the other end of the resistor R1. The connection point between the resistors R1, R5 and R6 is connected to the emitter of the first switching transistor. The collectors of each of the two transistors T3 and T4 are connected to the base of a respective one of the two switching transistors T1 and T2. Two diodes 10 and 11, and 12 and 13 are inserted between the collector of each of the transistors T3 and T4 and the base of each respective transistor T1 and T2. One of two control resistors R3 and R4 is connected in series with each two diodes, beyond the connection point of the two collectors of the transistors T3 and T4. The other ends of the control resistors are connected to the return line R.

The modification of the prior art devices according to the invention, causes the voltage drop to be considerably reduced because of the reduction in the number of sensing resistors compared to the state of the art. The voltage drop of the resistor R1 is simply used to regulate the current withdrawn at the outgoing line. The overall voltage drop in the circuit is practically halved compared with the conventional circuits according to FIGS. 1 and 2. The voltage drop of the circuit according to FIG. 1 is at least:

$$IP \times R3 + UBE1 + UBE3 + UCEsat2 + UBE4 = 3 \times UBE + UCEsat + IB \times R3$$

In the circuit according to FIG. 2 the voltage drop is at least:

$$UBE3 + UBEsat1 - UBE4 + UCEsat2 = 2 \times UBE + 2 \times UCEsat$$

However, the voltage drop in the embodiment according to FIG. 3 is at least:

$$UBE3 + UCEsat1 + UCEsat2 = UBE + 2UCEsat$$

As can easily be seen from the equations, this represents almost a halving of the voltage drop compared with the device according to FIG. 2.

Figure 4:
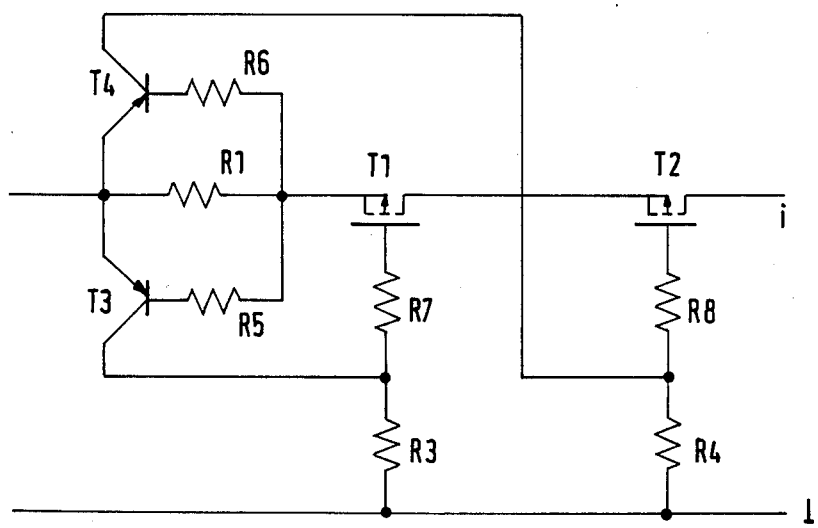
FIG. 4 is a circuit diagram of a second embodiment of a safety barrier according to the invention.

FIG. 4 illustrates another embodiment, in which the switching transistors T1 and T2 are high-resistance, controllable MOS power semiconductors, instead of the PNP transistors used in FIG. 3, which are just like the control transistors T3 and T4. In this way, it is possible to connect a respective resistor R7 and R8, instead of the diodes 10 and 11 or 12 and 13, to the bases of the two switching transistors T1 and T2. By using such power semiconductors, the two resistors R3 and R4 may be of very high resistance (e.g. 10 M Ohms), with the result that the leakage current to ground and/or to the return line R, is almost negligible. In addition, the high value of the resistors R3 and R4 provides a very good control gain. The overall voltage drop in a circuit with a short circuit current of 23.2 mA according to FIG. 4 is, for example, only 0.5 volt at 22 mA. However, due to the threshold voltage of the MOS power transistors T1 and T2, the circuit is only operationally ready at and above approximately 5 volts.

Figure 5:
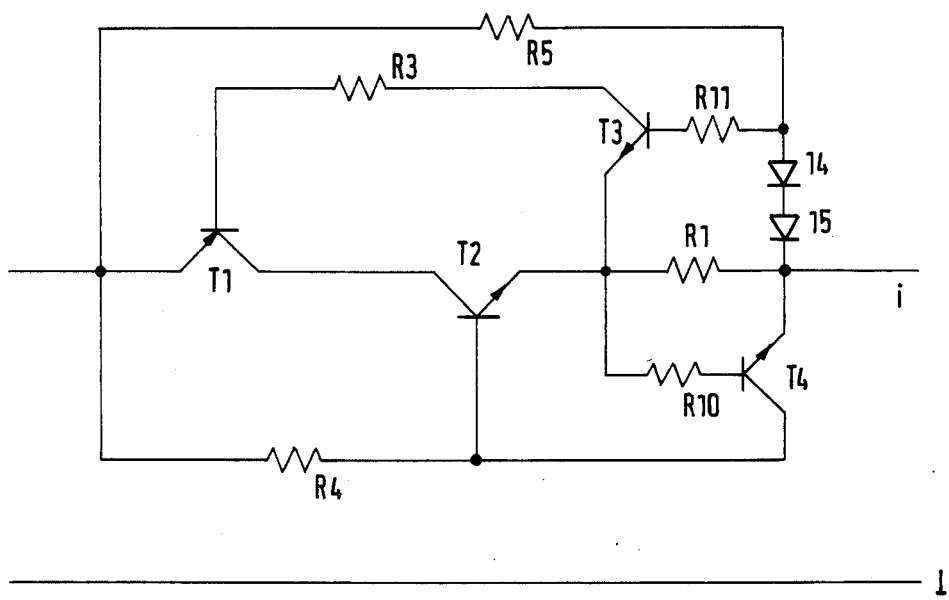
FIG. 5 is a circuit diagram of a third embodiment.

Whereas the circuits according to FIGS. 3 and 4 have a leakage current to the return line or to ground, the circuit according to FIG. 5 operates without such a leakage current to ground. The switching transistor T1 is a PNP transistor and its collector is connected to the collector of the second switching transistor T2 which is a NPN transistor. The emitter of the transistor T2 is connected through the resistor R1 to the output or outgoing line H. The resistor R1 is a common resistor for the two control transistors T3 and T4, as described below.

The emitter of the transistor T2 is connected to the emitter of the control transistor T3 and to the base of the control transistor T4 through a further resistor R10 connected to the base of the transistor T4.

The base of the transistor T3 is connected through a resistor R11 and two diodes 14 and 15 and through the other end of the resistor R1, to the emitter of the other transistor T4. One end of the resistor R5 is connected between the resistor R11 and the diode R14, and the other end of the resistor R5 is connected to the emitter of the transistor T1. Additionally, one end of the resistor R4 is connected to the emitter of the transistor T1, and the other end is connected to the base of the transistor T2 as well as to the collector of the transistor T4. The collector of the transistor T3 is connected through the resistor R3 to the base of the transistor T1. The circuit does not require a connecting lead to ground. The transistors T2 and T4 as well as the resistors R1 and R4 thus form a current source which is similar to that illustrated in FIG. 1. The transistor T3 is conducting through the resistor R5, as long as $UBE3 = 2 \times UD - UR1$. For a voltage $UD = UBE$, the transistor T3 begins to shut off at about $UR1 = 0.6$ volt. The transistor T1 is controlled through the resistor R3 and the conducting transistor T3. Therefore, as the current flowing through the resistor R1 increases, the transistor T3 and thus also the transistor T1 shut off. The minimum voltage drop is:

$$UBE1 + IB \times R3 + UCEsat3 + UBE4 = 2 \times UBE + IB \times R3 + UCEsat$$

Figure 6:
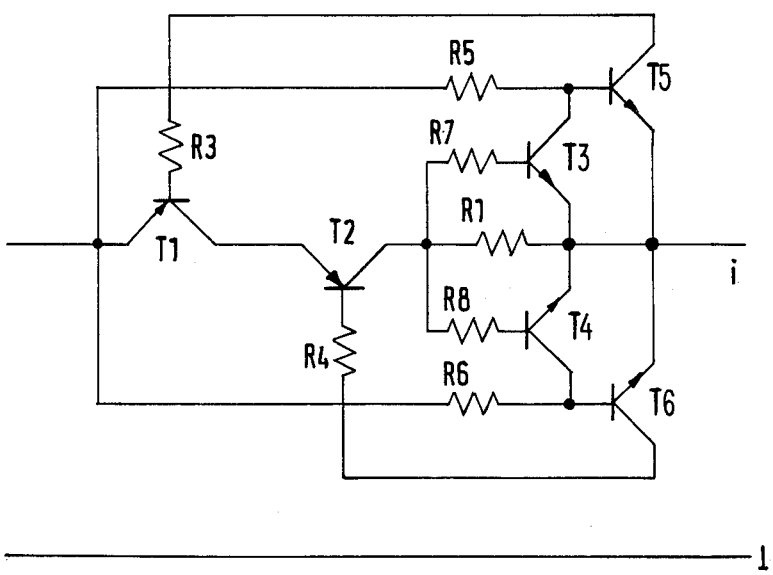
FIG. 6 is a circuit diagram of a fourth embodiment of a safety barrier according to the invention.

FIG. 6 illustrates a further development of the embodiment according to FIG. 5. The two switching transistors T1 and T2 are PNP transistors; the collector of the transistor T2 is connected to one end of the resistor R1; the bases of two control transistors T5 and T6 are connected through the resistors R7 and R8 to a point between the collector of the transistor T2 and the end of the resistor R1. The emitters of the two transistors T5 and T6 are connected to the other end of the resistor R1. Each of the two collectors of the transistors T5 and T6 is connected to a respective one of the bases of the two control transistors T3 and T4; one end of each of the resistors R6 and R5 is connected to the connection point between the collector of a respective one of the transistors T6 and T5 and the base of a respective one of the transistors T4 and T3. The other end of each of the resistors R6 and R5 is connected to the emitter of the transistor T1. The collector of the transistor T1 is connected to the emitter of the transistor T2. The collectors of each of the transistors T3 and T4 is connected through a respective one of the resistors R3 and R4 to the base of a respective one of the transistors T1 and T2. In this case as well, there is no connection between the circuit and the ground or return line R, and accordingly there is no leakage current. The advantage of this circuit compared with that of FIG. 5, is the utilization of the voltage drop at the resistor R1 to control the two transistors T1 and T2, so that both transistors can be saturated. The minimum voltage drop with this circuit is $$UCEsat1 + UCEsat2 + UBE5 = 2 \times UCEsat + UBE$$

In all of these circuits; the very low voltage drop is achieved by using the voltage drop at a single resistor for both current-limiting circuits, by using the safety of a prevention of unregulated currents flowing from the non-intrinsically safe input to the intrinsically safe output through two closed diodes connected in series or through series resistors even in the case of a fault, and furthermore by the use of high-resistance controllable semiconductors.

The polar transistors, as illustrated in the embodiments according to FIGS. 1 to 6, have a high output resistance and therefore can be used as current sources in principle, without additional regulating circuits. However, utilization in safety barriers is complicated by two problems: the higher the current, the lower the internal resistance, and in addition, the base must be supplied with a constant current that has to be regulated so that the temperature dependence can be compensated.

MOS transistors have the advantage that they constitute very good current sources even at high currents, and above all can be highimpedance voltage controlled. To this extent, MOS power semiconductors and power transistors can be used to great advantage, as is shown in FIG. 4, though a certain minimum voltage must of course be available in the case of power transistors The overall voltage drop of these circuits according to the invention is roughly 0.5 volt.

Figure 7:
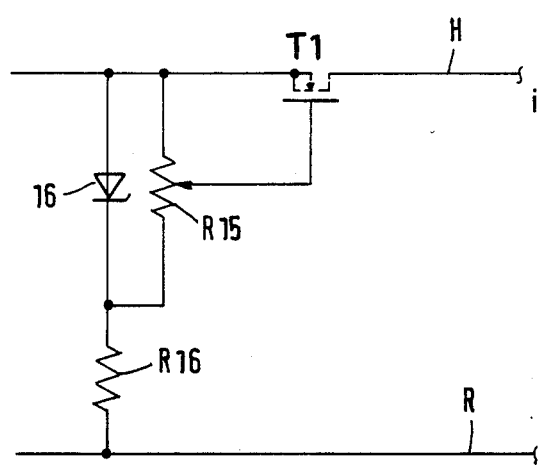
FIG. 7 is a circuit diagram of a fifth circuit embodiment in which the power source property of the switching transistor itself is utilized.

A sensing resistor is no longer required for regulation if the power source property of the component itself is utilized. The circuit according to FIG. 7 will be described as an example of meeting this purpose. Such a MOS power semiconductor T1 (reference BSS 97), having a base connected to a resistor R15 (voltage divider circuit), is incorporated in the outgoing line H. A Zener diode 16 and a high-resistance resistor R16 connected in series therewith are connected between the outgoing line H and the return line R. One side of the resistor R15 is connected to the outgoing line H upstream of the transistor T1, and the other side of the resistor R15 is connected to the connection point between the Zener diode 16 and resistor R16. The power source property of the transistor T1 is thus utilized in this way. Up to a value of 80% of the short circuit current, there is a voltage drop of only 0.17 volt.

We claim:

1. Intrinsically safe safety barrier, comprising an outgoing line, a return line, two switching transistors disposed serially connected in said outgoing line, at least two control transistors having base-emitter circuits for controlling said switching transistors in order to regulate current when current increases in said outgoing line, and a single sensing resistor connected in said outgoing line in said base-emitter circuits of each of said control transistors.

2. Safety barrier according to claim 1, wherein the emitters of each of said control transistors are jointly connected to one end of said sensing resistor, and the bases of each of said control transistors are jointly connected to the other end of said sensing resistor.

3. Safety barrier according to claim 1, wherein the emitters of each of said control transistors are jointly connected to one end of said sensing resistor, and including two other resistors each being connected between the base of a respective one of said control transistors and the other end of said sensing resistor.

4. Safety barrier according to claim 1 including two further control transistors for further controlling said switching transistors, each of said further control transistors having a base connected to the collector of a respective one of said at least two control transistors.

5. Safety barrier according to claim 1, wherein said control transistors are first and second control transistors, the emitter of said first and the base of said second control transistors are jointly connected to one end of said sensing resistor, and the emitter of said second and the base of said first control transistors are jointly connected to the other end of said sensing resistor.

6. Intrinsically safe safety barrier, comprising an outgoing line, and a return line and having no shunt path therebetween, two switching transistors disposed serially connected in said outgoing line, at least two control transistors having base-emitter circuits for controlling said switching transistors in order to regulate current when current increases in said outgoing line, and a single sensing resistor disposed serially connected in said outgoing line in said base-emitter circuits of each of said control transistors.

7. Safety barrier according to claim 6, wherein the emitters of each of said control transistors are jointly connected to one end of said sensing resistor, and the bases of each of said control transistors are jointly connected to the other end of said sensing resistor.

8. Safety barrier according to claim 6, wherein the emitters of each of said control transistors are jointly connected to one end of said sensing resistor, and including two other resistors each being connected between the base of a respective one of said control transistors and the other end of said sensing resistor.

9. Safety barrier according to claim 6, including two further control transistors for further controlling said switching transistors, each of said further control transistors having a base connected to the collector of a respective one of said at least two control transistors.

10. Safety barrier according to claim 6, wherein said control transistors are first and second control transistors, the emitter of said first and the base of said second control transistors are jointly connected to one end of said sensing resistor, and the emitter of said second and the base of said first control transistors are jointly connected to the other end of said sensing resistor.

* * * * *